(12) United States Patent
Choi et al.

(10) Patent No.: US 9,859,228 B2
(45) Date of Patent: Jan. 2, 2018

(54) DEVICE AND METHOD FOR GENERATING IDENTIFICATION KEY (71) Applicant: ICTK CO., LTD., Gyeonggi-do (KR)

(72) Inventors: Byong Deok Choi, Seoul (KR); Dong Kyue Kim, Seoul (KR)

(73) Assignee: ICTK CO., LTD., Gyeonggi-do (KR)

( * ) Notice: Subject to any disclaimer, the term of this patent is extended or adjusted under 35 U.S.C. 154(b) by 0 days.

(21) Appl. No.: 14/916,485

(22) PCT Filed: Feb. 17, 2014

(86) PCT No.: PCT/KR2014/001249
§ 371 (c)(1),
(2) Date: Mar. 3, 2016

(87) PCT Pub. No.: WO2015/034146
PCT Pub. Date: Mar. 12, 2015

(65) Prior Publication Data
US 2016/0211231 A1 Jul. 21, 2016

(30) Foreign Application Priority Data
Sep. 3, 2013 (KR) .................. 10-2013-0105385

(51) Int. Cl.
H01L 27/02 (2006.01)
H01L 23/00 (2006.01)
(Continued)

(52) U.S. Cl.
CPC ............ *H01L 23/576* (2013.01); *G06F 21/73* (2013.01); *G09C 1/00* (2013.01); *H01L 27/0207* (2013.01);
(Continued)

(58) Field of Classification Search
CPC ............ H01L 27/0262; H01L 27/0623; H01L 27/0664; H01L 27/092; H01L 27/10802;
(Continued)

(56) References Cited

U.S. PATENT DOCUMENTS

2013/0093502 A1  4/2013  Kim et al.
2013/0101114 A1  4/2013  Kim et al.

FOREIGN PATENT DOCUMENTS

EP        2677452 A1      12/2013
KR   WO 2010123185 A1 * 10/2010    ............. G06F 7/588
(Continued)

OTHER PUBLICATIONS

ISA Korean Intellectual Property Office, International Search Report Issued in Application No. PCT/KR2014/001249, May 23, 2014, WIPO, 5 pages.
(Continued)

*Primary Examiner* — Julio J Maldonado
*Assistant Examiner* — Rodolfo D Fortich
(74) *Attorney, Agent, or Firm* — McCoy Russell LLP (57) ABSTRACT Provided is a device for generating an identification key using a process variation during a manufacturing process of a conductive layer. The device for generating an identification key may include a conductive layer, which is disposed between a first node and a second node in a semiconductor chip, and which has a width that is at least a first threshold value but not more than a second threshold value, the first threshold value and the second threshold value being less than the minimum width according to the design rules that can ensure that the conductive layer is patterned such that the first node and the second node are electrically short-circuited, and a reader which provides an identification key by identifying if there is a short circuit between the first node and the second node.

7 Claims, 6 Drawing Sheets (51) Int. Cl.
*G06F 21/73* (2013.01)
*G09C 1/00* (2006.01)
*H04L 9/08* (2006.01)

(52) U.S. Cl.
CPC .... *H04L 9/0866* (2013.01); *H01L 2924/0002* (2013.01); *H04L 2209/12* (2013.01)

(58) Field of Classification Search
CPC ............ H01L 27/0248; H01L 27/0255; H01L 27/0259; H01L 27/0274; H01L 27/0292; H01L 27/0605
USPC .......................................... 257/43, 360, 370
See application file for complete search history.

(56) References Cited

FOREIGN PATENT DOCUMENTS

| KR | 101139630 B1 | 5/2012 |
| KR | 1020120089607 A | 8/2012 |
| WO | 2010076733 A1 | 7/2010 |
| WO | 2010123185 A1 | 10/2010 |
| WO | 2012077856 A1 | 6/2012 |

OTHER PUBLICATIONS

European Patent Office, Extended European Search Report Issued in Application No. 14841619.1, Dec. 21, 2016, Germany, 8 pages.

* cited by examiner

DEVICE AND METHOD FOR GENERATING IDENTIFICATION KEY

CROSS REFERENCE TO RELATED APPLICATIONS

The present application is a U.S. National Phase of International Patent Application Serial No. PCT/KR2014/001249, entitled "DEVICE AND METHOD FOR GENERATING IDENTIFICATION KEY," filed on Feb. 17, 2014, which claims priority to Korean Patent Application No. 10-2013-0105385, entitled "DEVICE AND METHOD FOR GENERATING IDENTIFICATION KEY," filed on Sep. 3, 2013, the entire contents of each of which are hereby incorporated by reference for all purposes.

TECHNICAL FIELD

The following description relates to a device and method for generating an identification key for hardware security, and more particularly, to a device and method for generating an identification key by implementing a physically unclonable function (PUF) based on a semiconductor process variation.

BACKGROUND ART

As an information-oriented society is being advanced, a necessity for protection of personal information is increasing. Also, there is a desire for a technology for building a security system configured to securely transmit the personal information by encrypting and decrypting the personal information.

Recently, various attacks, for example, a side channel attack or a reverse engineering attack, have been applied to an identification key stored in a computing device. For protection against the above attacks, a physically unclonable function (PUF) technology is being developed to securely generate and store an identification key.

A PUF may provide an identification key, that is, an unpredictable digital value. Individual PUFs may provide different digital values, even though an accurate manufacturing process is provided and the individual PUFs are manufactured through the same design and manufacturing process.

Accordingly, the PUF may be referred to as a "physical one-way function (POWF)" that is practically impossible to be duplicated.

The above characteristic of the PUF may be used to generate an identification key for security and/or authentication. For example, the PUF may be used to provide a unique key to distinguish devices from one another.

In Korean Patent Registration No. 10-1139630 (hereinafter, referred to as "'630 patent"), a method of implementing a PUF has been provided. The '630 patent discloses a method of probabilistically determining whether an interlayer contact or a via is formed between conductive layers of a semiconductor based on a semiconductor process variation.

DISCLOSURE OF INVENTION

Technical Solutions

According to an aspect of the present invention, there is provided a device for generating an identification key, the device including a conductive layer disposed between a first node and a second node in a semiconductor chip and having a width equal to or greater than a first threshold and equal to or less than a second threshold, the first threshold and the second threshold being less than a minimum width according to a design rule that ensures that the conductive layer is patterned so that the first node and the second node are electrically shorted, and a reader configured to determine whether the first node and the second node are shorted and to provide an identification key.

The first threshold may be a lower limit value of a width of the conductive layer to allow a difference between a probability that the first node and the second node are shorted and a probability that the first node and the second node are not shorted to be within a predetermined error range, and the second threshold may be an upper limit value of the width of the conductive layer to allow the difference between the probability that the first node and the second node are shorted and the probability that the first node and the second node are not shorted to be within the predetermined error range.

Also, the first threshold may be equal to or greater than a maximum width of the conductive layer to guarantee that the first node and the second node are open, and the second threshold may be equal to or less than a minimum width of the conductive layer to guarantee that the first node and the second node are shorted.

Whether the first node and the second node are shorted may be randomly determined by a process variation in a manufacturing process of the conductive layer.

The conductive layer may correspond to at least one of an N-well region, a P-well region, an N+ active region, a P+ active region, a poly layer and a metal layer.

According to another aspect of the present invention, there is provided a method of manufacturing a device for generating an identification key, the method including forming a conductive layer between a first node and a second node in a semiconductor chip, the conductive layer having a width equal to or greater than a first threshold and equal to or less than a second threshold, and the first threshold and the second threshold being less than a minimum width according to a design rule that ensures that the conductive layer is patterned so that the first node and the second node are electrically shorted, and forming a reader in the semiconductor chip, the reader being configured to determine whether the first node and the second node are shorted and to provide an identification key.

The first threshold may be a lower limit value of a width of the conductive layer to allow a difference between a probability that the first node and the second node are shorted and a probability that the first node and the second node are not shorted to be within a predetermined error range, and the second threshold may be an upper limit value of the width of the conductive layer to allow the difference between the probability that the first node and the second node are shorted and the probability that the first node and the second node are not shorted to be within the predetermined error range.

Also, the first threshold may be equal to or greater than a maximum width of the conductive layer to guarantee that the first node and the second node are open, and the second threshold may be equal to or less than a minimum width of the conductive layer to guarantee that the first node and the second node are shorted.

Whether the first node and the second node are shorted may be randomly determined by a process variation in a manufacturing process of the conductive layer.

According to another aspect of the present invention, there is provided a method of designing a device for generating an identification key, the method including disposing a conductive layer between a first node and a second node included in a semiconductor chip layout, the conductive layer having a width equal to or greater than a first threshold and equal to or less than a second threshold, and the first threshold and the second threshold being less than a minimum width according to a design rule that ensures that the conductive layer is patterned so that the first node and the second node are electrically shorted, and disposing a reader configured to determine whether the first node and the second node are shorted and to provide an identification key.

The first threshold may be a lower limit value of a width of the conductive layer to allow a difference between a probability that the first node and the second node are shorted and a probability that the first node and the second node are not shorted to be within a predetermined error range, and the second threshold may be an upper limit value of the width of the conductive layer to allow the difference between the probability that the first node and the second node are shorted and the probability that the first node and the second node are not shorted to be within the predetermined error range.

Also, the first threshold may be equal to or greater than a maximum width of the conductive layer to guarantee that the first node and the second node are open, and the second threshold may be equal to or less than a minimum width of the conductive layer to guarantee that the first node and the second node are shorted.

The conductive layer may correspond to at least one of an N-well region, a P-well region, an N+ active region, a P+ active region, a poly layer and a metal layer.

According to another aspect of the present invention, there is provided a method of generating an identification key, the method including generating a potential difference between a first node and a second node in a semiconductor chip, the first node and the second node being connected by a conductive layer, the conductive layer having a width equal to or greater than a first threshold and equal to or less than a second threshold, and the first threshold and the second threshold being less than a minimum width according to a design rule that ensures that the conductive layer is patterned so that the first node and the second node are electrically shorted, and determining, by a reader, whether the first node and the second node are electrically shorted and providing an identification key.

The first threshold may be a lower limit value of a width of the conductive layer to allow a difference between a probability that the first node and the second node are shorted and a probability that the first node and the second node are not shorted to be within a predetermined error range, and the second threshold may be an upper limit value of the width of the conductive layer to allow the difference between the probability that the first node and the second node are shorted and the probability that the first node and the second node are not shorted to be within the predetermined error range.

Also, the first threshold may be equal to or greater than a maximum width of the conductive layer to guarantee that the first node and the second node are open, and the second threshold may be equal to or less than a minimum width of the conductive layer to guarantee that the first node and the second node are shorted.

BEST MODE FOR CARRYING OUT THE INVENTION

Hereinafter, some embodiments will be described in detail with reference to the accompanying drawings. The inventive concept, however, should not be construed as limited to the embodiments set forth herein. Like reference numerals in the drawings refer to like elements throughout the present disclosure.

The terms used herein are mainly selected from general terms currently being used in light of functions in the present invention. Yet, the meanings of the terms used herein may be changed to keep up with the intent of an operator in the art, a custom, or the appearance of new technologies.

In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

Figure 1:
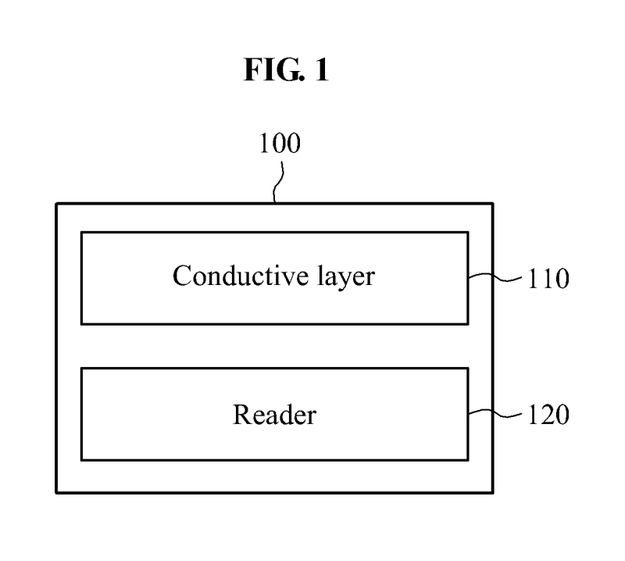
FIG. 1 is a block diagram illustrating of a device for generating an identification key according to an embodiment.

FIG. 1 is a block diagram illustrating a configuration of a device 100 for generating an identification key according to an embodiment.

The device 100 may correspond to at least a portion of a physically unclonable function (PUF) configured to allow nodes to be probabilistically connected by a process variation in a semiconductor manufacturing process.

The device 100 may include a conductive layer 110 configured to electrically short or open different nodes by the process variation.

Also, the device 100 may include a reader 120 configured to determine whether the nodes are shorted and to generate an identification key.

When a width of the conductive layer 110 is designed to be equal to or less than a minimum width of the conductive layer 110 required by a design rule for a semiconductor process, an identification key may be generated based on a probability that a pattern is formed in a specific range.

The design rule may specify a minimum width that ensures that the conductive layer 110 is patterned so that a first node and a second node are electrically shorted. Hereinafter, unless otherwise stated, the design rule will be understood as described above.

The conductive layer 110 may be disposed between a first node and a second node in a semiconductor chip, and may have a width equal to or greater than a first threshold and equal to or less than a second threshold.

The first threshold and the second threshold may be less than the minimum width according to the design rule that ensures that the conductive layer is patterned so that the first node and the second node are electrically shorted.

When the conductive layer 110 has a width equal to or greater than the minimum width according to the design rule, a pattern may be formed on the conductive layer 110 through a photolithography process at all times, and accordingly an electrical short between the first node and the second node by the conductive layer 110 may be guaranteed.

On the contrary, when the conductive layer 110 has a width less than the minimum width according to the design rule, a probability that the pattern is formed on the conductive layer 110 may gradually decrease, and accordingly a probability that the first node and the second node are electrically shorted may also decrease.

The width of the conductive layer 110 may be adjusted in a semiconductor design operation. However, this is merely an example, and it is possible to create the same result through an intended operation in a process. Accordingly, even though description of a portion of a design or a manufacturing process is provided below, it should be understood that there is no limitation to some embodiments by the description.

The device 100 may allow the conductive layer 110 to have a width less than the minimum width according to the design rule, and may generate an identification key based on whether the first node and the second node are shorted in the above width.

In an example, the first threshold may be a lower limit value of a width of the conductive layer 110 to allow a difference between a probability that the first node and the second node are shorted and a probability that the first node and the second node are not shorted to be within a predetermined error range. The second threshold may be an upper limit value of the width of the conductive layer 110 to allow the difference between the probability that the first node and the second node are shorted and the probability that the first node and the second node are not shorted to be within the predetermined error range.

For example, the predetermined error range may be set based on a specific value (for example, 50%) corresponding to the probability that the first node and the second node are shorted.

In this example, both a probability that the first node and the second node are electrically open and a probability that the first node and the second node are electrically shorted may exist, and may be utilized to generate the PUF.

In another example, the first threshold may be equal to or greater than a maximum width of the conductive layer 110 to guarantee that the first node and the second node are open. The second threshold may be equal to or less than a minimum width of the conductive layer 110 to guarantee that the first node and the second node are shorted.

When the conductive layer 110 has a width less than the minimum width according to the design rule, a probability that a pattern is formed on the conductive layer 110 through a photolithography process may gradually decrease. Also, when the width is equal to or less than a specific value, the first node and the second node may be inevitably electrically open, because the pattern is formed abnormally. In this example, the first threshold may be set to be equal to or greater than a maximum value of a width range of the conductive layer 110 in which the first node and the second node are open at all times. Thus, it is possible to have both a probability that the first node and the second node are electrically open and a probability that the first node and the second node are electrically shorted.

When the width of the conductive layer 110 increases, a probability that the pattern is formed may also increase. When the width is equal to or greater than a specific value, the first node and the second node may be inevitably electrically shorted, because the pattern is formed at all times. In this example, the second threshold may be set to be equal to or less than a minimum value of a width range of the conductive layer 110 in which the first node and the second node are shorted at all times. Thus, it is possible to have both the probability that the first node and the second node are electrically open and the probability that the first node and the second node are electrically shorted.

In this example, when the width of the conductive layer 110 is properly set, whether the first node and the second node are shorted may be randomly determined by a process variation in a manufacturing process of the conductive layer 110.

The conductive layer 110 may correspond to at least one of an N-well region, a P-well region, an N+ active region, a P+ active region, a poly layer and a metal layer.

The reader 120 may determine whether the first node and the second node are shorted and may provide an identification key based on an output value. An identification key generation process and a circuit configuration of the reader 120 will be further described with reference to FIGS. 5 and 6.

Figure 2:
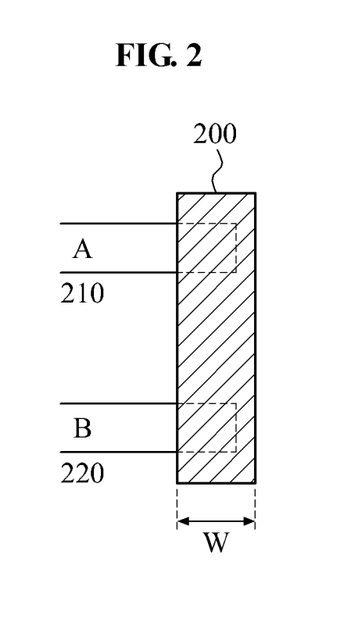
FIG. 2 is a diagram provided to describe a concept of a configuration of a conductive layer according to an embodiment.

FIG. 2 is a diagram provided to describe a concept of a configuration of a conductive layer 200 according to an embodiment.

The conductive layer 200 may be disposed between a first node 210 and a second node 220 located in a semiconductor chip.

When a pattern is formed on the conductive layer 200 by a photolithography process of a semiconductor, the first node 210 and the second node 220 may be electrically shorted. On the contrary, when the pattern is not formed, the first node 210 and the second node 220 may be electrically open.

In an example, when the conductive layer 200 has a width equal to or greater than a minimum width required by a design rule for a semiconductor process, the pattern may be formed on the conductive layer 200 at all times, and accordingly an electrical short between the first node 210 and the second node 220 may be guaranteed.

In another example, when the conductive layer 200 has a width less than the minimum width required by the design rule, a probability that the pattern is formed on the conductive layer 200 may gradually decrease, and accordingly a probability that the first node 210 and the second node 220 are electrically shorted may also decrease.

When the conductive layer 200 is formed, the width of the conductive layer 200 may be set so that a probability that the pattern is formed and a probability that the pattern is not formed may coexist, and accordingly whether the first node 210 and the second node 220 are electrically shorted may be utilized to generate a PUF.

For example, a width W of the conductive layer 200 may be set to be less than the minimum width according to the design rule, to prevent the first node 210 and the second node 220 from being electrically shorted at all times.

A pattern formation result based on a change in the width of the conductive layer 200 will be further described with reference to FIGS. 3 and 4.

Figure 3:
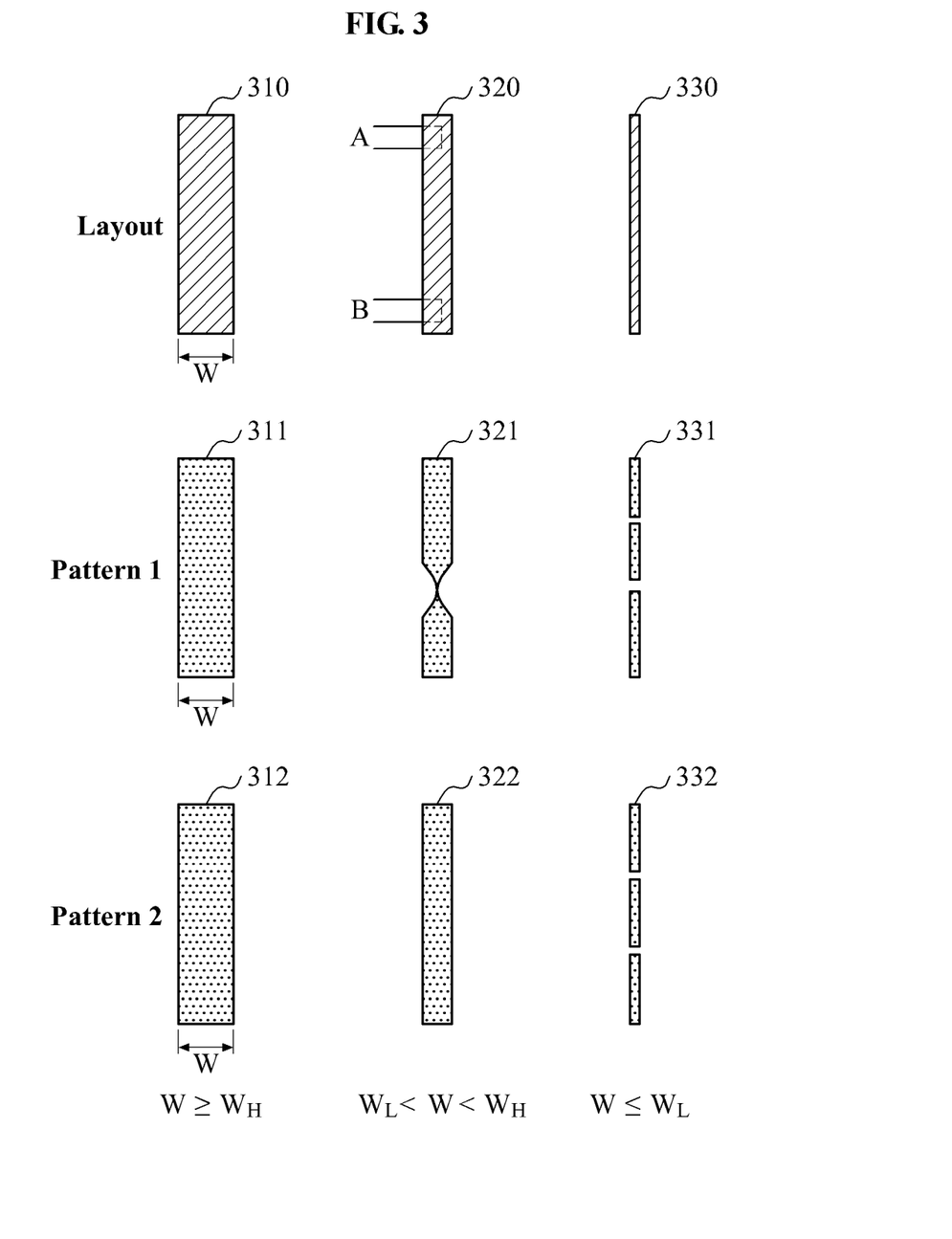
FIG. 3 is a diagram illustrating a pattern formation based on a change in a width of a conductive layer according to an embodiment.

FIG. 3 illustrates a pattern formation based on a change in a width of a conductive layer according to an embodiment. FIG. 4 is a graph illustrating a probability that a first node and a second node are electrically open based on the change in the width of the conductive layer according to an embodiment.

Referring to FIG. 3, based on a width W of a conductive layer, whether a pattern is formed, and whether a first node and a second node are shorted may be determined.

Figure 4:
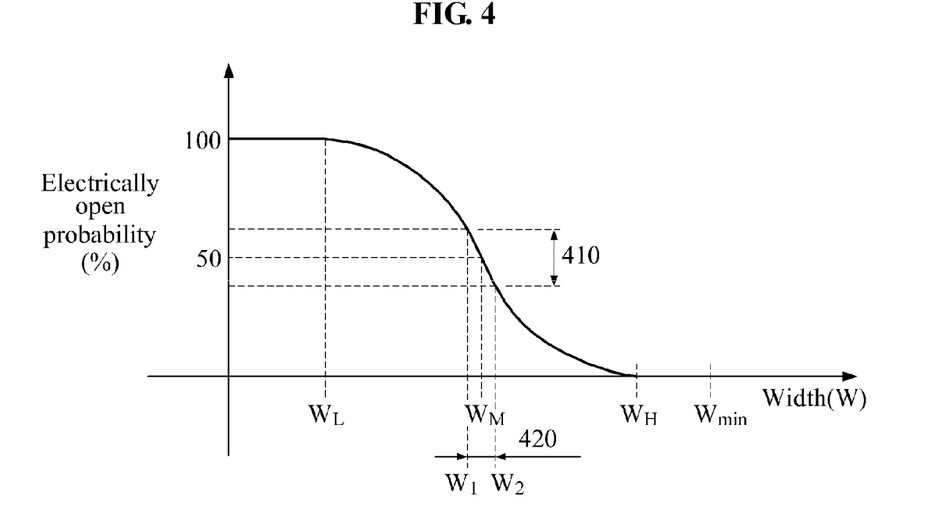
FIG. 4 is a graph illustrating a probability that a first node and a second node are electrically open based on a change in a width of a conductive layer according to an embodiment.

In an example, when a width of a conductive layer 310 is equal to or greater than $W_H$ of FIG. 4 patterns 311 and 312 may be formed on the conductive layer at all times, and a first node and a second node may be electrically shorted at all times. In this example, $W_H$ may be set as a minimum value of the width of the conductive layer 310 to guarantee that the first node and the second node are electrically shorted.

For example, when the conductive layer has a width less than a minimum width according to the design rule, a probability that the pattern is formed may decrease based on a reduction in the width of the conductive layer, and accordingly a probability that the first node and the second node are electrically open may increase.

In another example, when a conductive layer 330 has a width equal to or less than $W_L$, patterns 331 and 332 may be formed abnormally on the conductive layer, and accordingly a first node and a second node may be electrically open at all times. In this example, $W_L$ may be set to a maximum value of a width range of the conductive layer 330 to guarantee that the first node and the second node are electrically open.

In still another example, when a conductive layer 320 has a width between $W_H$ and $W_L$, both a probability that a pattern is formed and a probability that the pattern is not formed may exist. When a pattern 322 is formed on the conductive layer, the first node and the second node may be electrically shorted. When a pattern 321 is not formed, the first node and the second node may be electrically open.

When a pattern is formed abnormally on a conductive layer, for example, when the pattern 331 or 332 is not formed on all portions of the conductive layer, a first node and a second node may be electrically open. However, when the pattern 321 is formed, the first node and the second node may be partially open.

For example, the conductive layer 320 may have a width equal to or greater than a first threshold and equal to or less than a second threshold. In this example, the first threshold and the second threshold may be set in a range less than a minimum width according to the design rule that ensures that the conductive layer 320 is patterned so that the first node and the second node are electrically shorted.

The first threshold may be a lower limit value $W_1$ of a width of the conductive layer 320 to allow a difference between a probability that the first node and the second node are shorted and a probability that the first node and the second node are not shorted to be within a predetermined error range.

The second threshold may be an upper limit value $W_2$ of the width of the conductive layer 320 to allow the difference between the probability that the first node and the second node are shorted and the probability that the first node and the second node are not shorted to be within the predetermined error range.

The first threshold, that is, the lower limit value $W_1$ may be equal to or greater than a maximum width $W_L$ of the conductive layer 320 to guarantee that the first node and the second node are open.

Also, the second threshold, that is, the upper limit value $W_2$ may be equal to or less than a minimum width $W_H$ of the conductive layer 320 to guarantee that the first node and the second node are shorted.

Whether the first node and the second node are shorted may be randomly determined by a process variation in a manufacturing process of the conductive layer, and thus it is possible to guarantee randomness and time-invariance to implement a PUF.

Referring to the graph of FIG. 4, a horizontal axis represents a width of the conductive layer 200, and a vertical axis represents a probability that the first node 210 and the second node 220 are electrically open.

In the graph, $W_H$ denotes a minimum width of the conductive layer 200 to guarantee that the first node 210 and the second node 220 are shorted, and $W_L$ denotes a maximum width of the conductive layer 200 to guarantee that the first node 210 and the second node 220 are open.

Also, $W_{min}$ denotes a minimum width of the conductive layer 200 specified by the design rule that guarantees patterning of the conductive layer 200 to electrically short the first node 210 and the second node 220, and may be set with a predetermined margin with $W_H$.

In addition, $W_M$ denotes a width of the conductive layer 200 representing that a probability that the first node 210 and the second node 220 are electrically shorted or electrically open theoretically corresponds to 50%.

For example, when the width W of the conductive layer 200 is equal to $W_M$, an identification key, that is, a digital value generated by the device 100 may have maximum randomness. However, because it is difficult to accurately determine $W_M$ in an actual process, the width W may be set to be closest to $W_M$ by repeating a process of manufacturing and measuring various widths of the conductive layer.

Thus, to generate an identification key with guaranteed randomness, the width W of the conductive layer 200 may be set and/or found so that a difference between a probability that the first node 210 and the second node 220 are electrically shorted and a probability that the first node 210 and the second node 220 are open may be minimized.

For example, the width of the conductive layer 200 may be set in a range of $W_1$ to $W_2$ so that whether the first node 210 and the second node 220 are shorted may have a predetermined error based on 50%.

In this example, $W_1$ may be a lower limit value of a width of the conductive layer 200 to allow a difference between the probability that the first node 210 and the second node 220 are shorted and the probability that the first node 210 and the second node 220 are not shorted to be within a predetermined error range, and may be equal to or greater than a maximum width of the conductive layer 200 to guarantee that the first node 210 and the second node 220 are open.

Also, $W_2$ may be an upper limit value of the width of the conductive layer 200 to allow the difference between the probability that the first node 210 and the second node 220 are shorted and the probability that the first node 210 and the second node 220 are not shorted to be within the predetermined error range, and may be equal to or less than a minimum width of the conductive layer 200 to guarantee that the first node 210 and the second node 220 are shorted.

Figure 5:
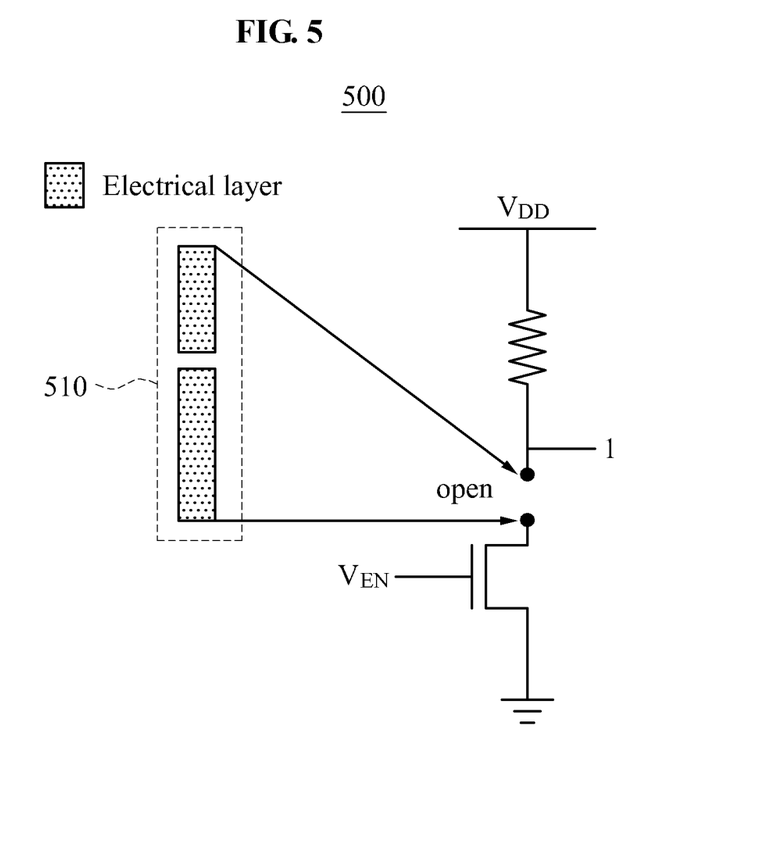
FIG. 5 is a diagram illustrating an identification key generation circuit in an example in which a first node and a second node are electrically open by a conductive layer in a device for generating an identification key according to an embodiment.

FIG. 5 illustrates an identification key generation circuit 500 in an example in which a first node and a second node are electrically open by a conductive layer 510 in a device for generating an identification key according to an embodiment.

The identification key generation circuit 500 may determine whether the first node and the second node are electrically shorted by the conductive layer 510, and may provide an identification key.

The identification key generation circuit 500 may have a structure of a pull-down circuit including a resistor and an N-channel metal oxide semiconductor (NMOS) transistor. Based on whether the first node and the second node in the conductive layer 510 are open or shorted, whether a connection between an output node and a drain node of the NMOS transistor is open or shorted may be determined.

When an enable signal transmitted to a gate of the NMOS transistor has a high value, and when the first node and the second node are electrically open by the conductive layer 510, an output value may be "1."

The identification key generation circuit 500 may be implemented by applying the same principle to a P-channel metal oxide semiconductor (PMOS) transistor in addition to the NMOS transistor, and may also be implemented using, for example, a bipolar junction transistor (BJT) or a diode.

Figure 6:
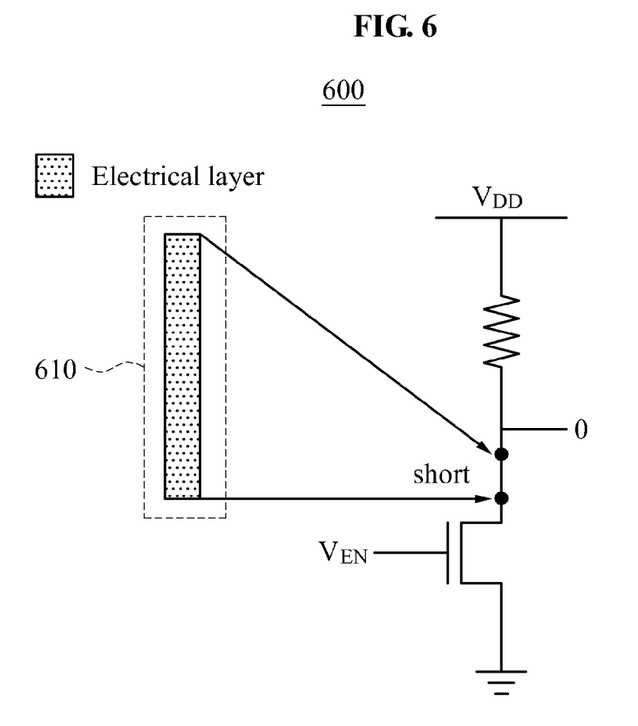
FIG. 6 is a diagram illustrating an identification key generation circuit in an example in which a first node and a second node are electrically shorted by a conductive layer in a device for generating an identification key according to an embodiment.

FIG. 6 illustrates an identification key generation circuit 600 in an example in which a first node and a second node are electrically shorted by a conductive layer 610 in a device for generating an identification key according to an embodiment.

The identification key generation circuit 600 may determine whether the first node and the second node are electrically shorted by the conductive layer 610, and may provide an identification key.

The identification key generation circuit 600 may have a structure of a pull-down circuit including a resistor and an NMOS transistor. Based on whether the first node and the second node in the conductive layer 610 are open or shorted, whether a connection between an output node and a drain node of the NMOS transistor is open or shorted may be determined.

When an enable signal transmitted to a gate of the NMOS transistor has a high value, and when the first node and the second node are electrically shorted by the conductive layer 610, an output value may be "0."

The identification key generation circuit 600 may be implemented by applying the same principle to a PMOS transistor in addition to the NMOS transistor, and may also be implemented using, for example, a BJT or a diode.

Figure 7:
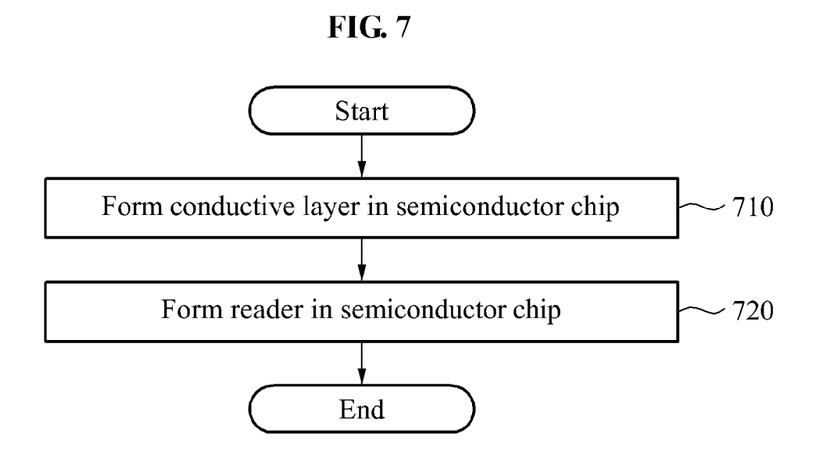
FIG. 7 is a flowchart illustrating a method of manufacturing a device for generating an identification key according to an embodiment.

FIG. 7 is a flowchart illustrating a method of manufacturing a device for generating an identification key according to an embodiment.

In operation 710, a conductive layer 110 may be formed between a first node and a second node in a semiconductor chip.

The conductive layer 110 may have a width equal to or greater than a first threshold and equal to or less than a second threshold. The first threshold and the second threshold may be less than a minimum width according to a design rule that ensures that the conductive layer 110 is patterned so that the first node and the second node are electrically shorted.

In an example, the first threshold may be a lower limit value of a width of the conductive layer 110 to allow a difference between a probability that the first node and the second node are shorted and a probability that the first node and the second node are not shorted to be within a predetermined error range. The second threshold may be an upper limit value of the width of the conductive layer 110 to allow the difference between the probability that the first node and the second node are shorted and the probability that the first node and the second node are not shorted to be within the predetermined error range.

For example, the predetermined error range may be set based on a specific value (for example, 50%) corresponding to the probability that the first node and the second node are shorted.

In this example, both a probability that the first node and the second node are electrically open and a probability that the first node and the second node are electrically shorted may exist, and may be utilized to generate a PUF.

In another example, the first threshold may be equal to or greater than a maximum width of the conductive layer 110 to guarantee that the first node and the second node are open. The second threshold may be equal to or less than a minimum width of the conductive layer 110 to guarantee that the first node and the second node are shorted.

When the conductive layer 110 has a width less than the minimum width according to the design rule, a probability that a pattern is formed on the conductive layer 110 through a photolithography process may gradually decrease. Also, when the width is equal to or less than a specific value, the first node and the second node may be inevitably electrically open, because the pattern is formed abnormally. In this example, the first threshold may be set to be equal to or greater than a maximum value of a width range of the conductive layer 110 in which the first node and the second node are open at all times. Thus, it is possible to have both a probability that the first node and the second node are electrically open and a probability that the first node and the second node are electrically shorted.

When the width of the conductive layer 110 increases, a probability that the pattern is formed may also increase. When the width is equal to or greater than a specific value, the first node and the second node may be inevitably electrically shorted, because the pattern is formed at all times. In this example, the second threshold may be set to be equal to or less than a minimum value of a width range of the conductive layer 110 in which the first node and the second node are shorted at all times. Thus, it is possible to have both the probability that the first node and the second node are electrically open and the probability that the first node and the second node are electrically shorted.

When the width of the conductive layer 110 is properly set in operation 710, whether the first node and the second node are shorted may be randomly determined by a process variation in a manufacturing process of the conductive layer 110.

In operation 720, a reader 120 may be formed in the semiconductor chip. The reader 120 may determine whether the first node and the second node are shorted, and may provide an identification key based on an output value.

An identification key generation process and a circuit configuration of the reader 120 have been described above with reference to FIGS. 5 and 6.

Figure 8:
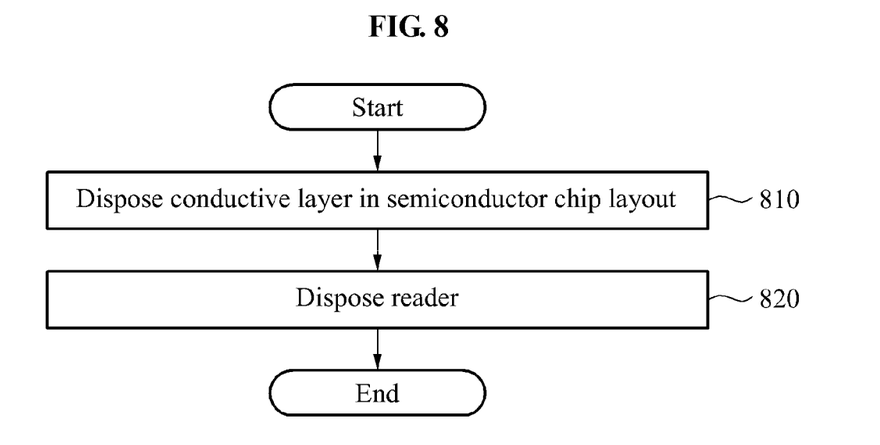
FIG. 8 is a flowchart illustrating a method of designing a device for generating an identification key according to an embodiment.

FIG. 8 is a flowchart illustrating a method of designing a device for generating an identification key according to an embodiment.

In operation 810, a conductive layer 110 having a width equal to or greater than a first threshold and equal to or less than a second threshold may be disposed between a first node and a second node included in a semiconductor chip layout.

The first threshold and the second threshold may be less than a minimum width according to a design rule that ensures that the conductive layer 110 is patterned so that the first node and the second node are electrically shorted.

In an example, the first threshold may be a lower limit value of a width of the conductive layer 110 to allow a difference between a probability that the first node and the second node are shorted and a probability that the first node and the second node are not shorted to be within a predetermined error range. The second threshold may be an upper limit value of the width of the conductive layer 110 to allow the difference between the probability that the first node and the second node are shorted and the probability that the first node and the second node are not shorted to be within the predetermined error range.

In another example, the first threshold may be equal to or greater than a maximum width of the conductive layer 110 to guarantee that the first node and the second node are open, and the second threshold may be equal to or less than a minimum width of the conductive layer 110 to guarantee that the first node and the second node are shorted.

The conductive layer 110 may correspond to at least one of an N-well region, a P-well region, an N+ active region, a P+ active region, a poly layer and a metal layer.

In operation 820, a reader 120 configured to determine whether the first node and the second node are shorted and to provide an identification key may be disposed.

Figure 9:
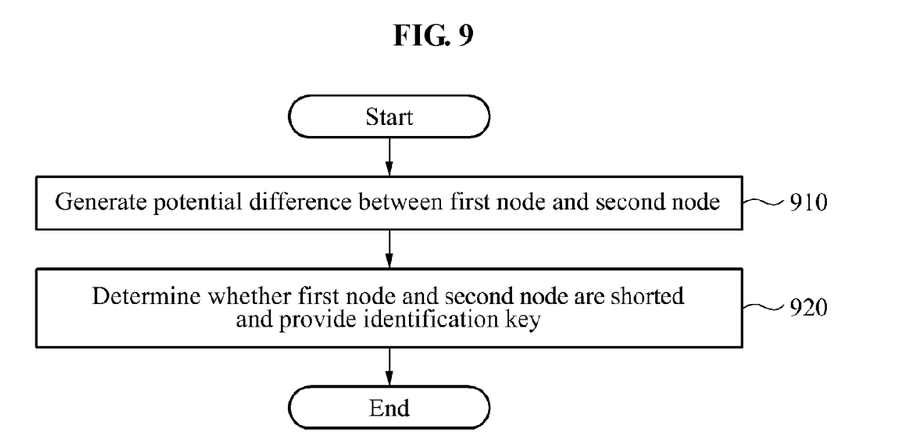
FIG. 9 is a flowchart illustrating a method of generating an identification key according to an embodiment.

FIG. 9 is a flowchart illustrating a method of generating an identification key according to an embodiment.

In operation 910, a potential difference may be generated between a first node and a second node in a semiconductor chip.

The first node and the second node may be connected by a conductive layer 110, and the conductive layer 110 may have a width equal to or greater than a first threshold and equal to or less than a second threshold. The first threshold and the second threshold may be less than a minimum width according to a design rule that ensures that the conductive layer 110 is patterned so that the first node and the second node are electrically shorted.

The first threshold may be a lower limit value of a width of the conductive layer 110 to allow a difference between a probability that the first node and the second node are shorted and a probability that the first node and the second node are not shorted to be within a predetermined error range, and may be equal to or greater than a maximum width of the conductive layer 110 to guarantee that the first node and the second node are open.

Also, the second threshold may be an upper limit value of the width of the conductive layer 110 to allow the difference between the probability that the first node and the second node are shorted and the probability that the first node and the second node are not shorted to be within the predetermined error range, and may be equal to or less than a minimum width of the conductive layer 110 to guarantee that the first node and the second node are shorted.

In operation 920, the reader 120 may determine whether the first node and the second node are electrically shorted and may provide an identification key.

An identification key generation process and a circuit configuration of the reader 120 have been described above with reference to FIGS. 5 and 6.

The units described herein may be implemented using hardware components, software components, and/or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A device for generating an identification key, the device comprising:
   a conductive layer located between a first node and a second node in a semiconductor chip and having a width equal to or greater than a first threshold and equal to or less than a second threshold, the first threshold and the second threshold being less than a minimum width, wherein the width of the conductive layer is patterned so that the first node and the second node are electrically shorted; and
   a reader configured to determine whether the first node and the second node are shorted and to provide an identification key.

2. The device of claim 1, wherein the first threshold is a lower limit value of the width of the conductive layer to allow a difference between a probability that the first node and the second node are shorted and a probability that the first node and the second node are not shorted to be within a predetermined error range, and
   wherein the second threshold is an upper limit value of the width of the conductive layer to allow the difference between the probability that the first node and the second node are shorted and the probability that the first node and the second node are not shorted to be within the predetermined error range.

3. The device of claim 1, wherein the first threshold is equal to or greater than a maximum width of the conductive layer to guarantee that the first node and the second node are open, and
   wherein the second threshold is equal to or less than a minimum width of the conductive layer to guarantee that the first node and the second node are shorted.

4. The device of claim 1, wherein whether the first node and the second node are shorted is randomly determined by a process variation in a manufacturing process of the conductive layer.

5. The device of claim 1, wherein the conductive layer corresponds to at least one of an N-well region, a P-well region, an N+ active region, a P+ active region, a poly layer and a metal layer.

6. The device of claim 1, wherein the width of the conductive layer having the pattern is shaped with a pattern formed by a change in the width.

7. The device of claim 6, wherein the change in the width includes a narrowing of the width.

* * * * *